(12) United States Patent
Troy et al.

(10) Patent No.: US 10,416,836 B2
(45) Date of Patent: Sep. 17, 2019

(54) VIEWPOINT NAVIGATION CONTROL FOR THREE-DIMENSIONAL VISUALIZATION USING TWO-DIMENSIONAL LAYOUTS

(71) Applicant: The Boeing Company, Chicago, IL (US)

(72) Inventors: James J. Troy, Issaquah, WA (US); Katherine I. Meza, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 15/206,911

(22) Filed: Jul. 11, 2016

(65) Prior Publication Data
US 2018/0011620 A1   Jan. 11, 2018

(51) Int. Cl.
*G06F 3/0481* (2013.01)
*G06F 16/958* (2019.01)
*G06F 3/0484* (2013.01)
*H04L 29/08* (2006.01)

(52) U.S. Cl.
CPC ........ *G06F 3/04815* (2013.01); *G06F 16/958* (2019.01); *H04L 67/02* (2013.01)

(58) Field of Classification Search
None
See application file for complete search history.

(56) References Cited

U.S. PATENT DOCUMENTS

| | | | | |
|---|---|---|---|---|
| 4,734,690 A | * | 3/1988 | Waller | G06T 15/20 345/427 |
| 5,958,008 A | * | 9/1999 | Pogrebisky | G06F 11/32 707/E17.116 |
| 6,049,582 A | * | 4/2000 | Navab | A61B 6/4441 378/17 |
| 6,313,836 B1 | * | 11/2001 | Russell, Jr. | G06F 3/04812 345/419 |
| 6,380,936 B1 | * | 4/2002 | Olynyk | G06T 15/04 345/427 |

(Continued)

OTHER PUBLICATIONS

Perspective Projection Transformation, Feb. 21, 2008, 15 pages.*

(Continued)

*Primary Examiner* — Yongjia Pan
(74) *Attorney, Agent, or Firm* — Ostrager Chong Flaherty & Broitman P.C.

(57) ABSTRACT

Systems and methods for supplying an open interface (e.g., web pages) for viewpoint navigation control of a three-dimensional (3-D) visualization of an object that is simple to create and fast and easy to use. This viewpoint navigation control application allows users to control the viewpoint in a 3-D environment by interacting with (e.g., clicking on) a 2-D hyperlink layout within a web browser (or other 2-D viewer with hyperlink capability). Position and orientation data for a selected viewpoint are transferred as part of a command message sent to the 3-D visualization application through an application programming interface when users select a hyperlink from a web page displayed by the 2-D layout application. The 3-D visualization application then retrieves data and displays a view of at least a portion of the 3-D model of the object with the predefined viewpoint specified in the command message.

18 Claims, 11 Drawing Sheets

(56) References Cited

U.S. PATENT DOCUMENTS

| | | | | |
|---|---|---|---|---|
| 6,388,688 | B1* | 5/2002 | Schileru-Key | G06F 3/04815 715/854 |
| 6,563,529 | B1* | 5/2003 | Jongerius | G06F 3/04815 345/629 |
| 6,572,662 | B2* | 6/2003 | Manohar | G06F 17/30873 707/999.01 |
| 6,636,210 | B1* | 10/2003 | Cheng | G06T 19/003 345/419 |
| 6,731,314 | B1* | 5/2004 | Cheng | G06F 16/954 715/848 |
| 6,906,712 | B2* | 6/2005 | Lee | G06T 17/005 345/420 |
| 7,042,468 | B2* | 5/2006 | Schwegler, Jr. | G06F 17/5004 345/629 |
| 7,076,735 | B2* | 7/2006 | Callegari | G06T 15/005 345/582 |
| 7,281,213 | B2* | 10/2007 | Callegari | G06T 15/005 345/582 |
| 7,467,356 | B2* | 12/2008 | Gettman | G06F 3/04815 707/E17.111 |
| 7,735,018 | B2* | 6/2010 | Bakhash | G06F 3/04815 715/782 |
| 7,747,570 | B2* | 6/2010 | le Masne de Chermont | G06T 17/00 707/610 |
| 7,814,436 | B2* | 10/2010 | Schrag | G06F 3/04815 715/836 |
| 8,264,494 | B2* | 9/2012 | Kilani | G06T 15/005 345/501 |
| 8,294,732 | B2* | 10/2012 | Cheng | A63F 13/10 345/619 |
| 8,346,020 | B2 | 1/2013 | Guntur | |
| 8,456,467 | B1* | 6/2013 | Hickman | G06T 15/005 345/419 |
| 8,533,580 | B1* | 9/2013 | Xu | G06F 3/04815 715/205 |
| 8,659,595 | B2* | 2/2014 | Chin | G06T 19/00 345/419 |
| 9,177,085 | B2 | 11/2015 | Snyder et al. | |
| 9,183,672 | B1* | 11/2015 | Hickman | G06T 17/00 |
| 9,280,272 | B2* | 3/2016 | Unnikrishnan | G06F 3/04815 |
| 9,292,180 | B2 | 3/2016 | Gass et al. | |
| 9,338,440 | B2* | 5/2016 | Li | H04N 5/23293 |
| 9,541,417 | B2* | 1/2017 | Piemonte | G01C 21/3638 |
| 9,696,868 | B2* | 7/2017 | Bakhash | G06F 3/04815 |
| 2001/0019337 | A1* | 9/2001 | Kim | G06F 3/04815 715/757 |
| 2003/0071810 | A1* | 4/2003 | Shoov | G06F 17/50 345/420 |
| 2003/0197737 | A1* | 10/2003 | Kim | G06F 16/954 715/781 |
| 2003/0218615 | A1* | 11/2003 | Gelb | G06T 9/00 345/555 |
| 2004/0056883 | A1* | 3/2004 | Wierowski | G06F 3/0482 715/719 |
| 2005/0179691 | A1* | 8/2005 | Johnson | G06T 1/60 345/552 |
| 2005/0216515 | A1* | 9/2005 | Bray | G06F 17/30241 |
| 2006/0132482 | A1* | 6/2006 | Oh | G06T 13/80 345/419 |
| 2006/0190812 | A1* | 8/2006 | Ellenby | G06F 17/30259 715/209 |
| 2007/0070066 | A1* | 3/2007 | Bakhash | G06F 3/04815 345/419 |
| 2008/0028341 | A1* | 1/2008 | Szeliski | G06F 3/04815 715/854 |
| 2008/0033641 | A1* | 2/2008 | Medalia | G06F 3/04815 701/533 |
| 2008/0129818 | A1* | 6/2008 | Miller | G06T 19/003 348/36 |
| 2008/0222538 | A1* | 9/2008 | Cardu | G06F 3/04845 715/760 |
| 2008/0238916 | A1* | 10/2008 | Ghosh | G06F 3/04815 345/419 |
| 2009/0031246 | A1* | 1/2009 | Cowtan | G06Q 30/00 715/786 |
| 2009/0113349 | A1* | 4/2009 | Zohar | G06Q 30/00 715/852 |
| 2009/0237396 | A1* | 9/2009 | Venezia | G06T 19/00 345/419 |
| 2010/0005424 | A1* | 1/2010 | Sundaresan | G06F 3/04815 715/849 |
| 2010/0283781 | A1* | 11/2010 | Kriveshko | G06T 17/00 345/419 |
| 2011/0131597 | A1* | 6/2011 | Cera | G01C 21/32 725/24 |
| 2011/0279446 | A1* | 11/2011 | Castro | G01C 21/20 345/419 |
| 2012/0169734 | A1* | 7/2012 | Snavely | G06F 17/30274 345/419 |
| 2012/0297346 | A1* | 11/2012 | Hoffknecht | G05B 15/02 715/850 |
| 2012/0304105 | A1 | 11/2012 | Rosman LaFever et al. | |
| 2013/0226529 | A1* | 8/2013 | Santiquet | G06F 17/50 703/1 |
| 2013/0271462 | A1* | 10/2013 | Frank | G06Q 50/16 345/420 |
| 2013/0300740 | A1* | 11/2013 | Snyder | G06F 3/016 345/420 |
| 2013/0326424 | A1* | 12/2013 | Queric | G06F 3/04815 715/850 |
| 2013/0326426 | A1* | 12/2013 | Queric | G06F 3/04815 715/851 |
| 2014/0098118 | A1* | 4/2014 | Liu | G06F 9/45529 345/522 |
| 2014/0129990 | A1* | 5/2014 | Xin | G06F 3/017 715/849 |
| 2014/0215296 | A1* | 7/2014 | Chen | G06F 17/30156 715/205 |
| 2014/0245206 | A1 | 8/2014 | Senesac | |
| 2014/0253538 | A1* | 9/2014 | Bailiang | G06T 15/08 345/419 |
| 2014/0298216 | A1 | 10/2014 | Prazak et al. | |
| 2014/0313220 | A1* | 10/2014 | Sullivan | G06F 3/04815 345/619 |
| 2015/0089344 | A1* | 3/2015 | Pickering | G06F 17/5004 715/215 |
| 2015/0091906 | A1* | 4/2015 | Dishno | G06F 16/9577 345/427 |
| 2015/0242767 | A1* | 8/2015 | Chatzinikos | G06Q 10/02 705/5 |
| 2016/0188159 | A1* | 6/2016 | Dayde | G06F 3/04815 715/782 |
| 2016/0357410 | A1* | 12/2016 | Frankel | G06F 3/04845 |
| 2017/0336942 | A1* | 11/2017 | Bakhash | G06F 3/0482 |

OTHER PUBLICATIONS

Explaining Homogeneous Coordinates & Projective Geometry, Feb. 24, 2014, 10 pages.*

Homogeneous coordinates, Jules BloomenthalJon Rokne, 1994, 12 pages.*

* cited by examiner

VIEWPOINT NAVIGATION CONTROL FOR THREE-DIMENSIONAL VISUALIZATION USING TWO-DIMENSIONAL LAYOUTS

BACKGROUND

This disclosure generally relates to three-dimensional (3-D) visualization systems. In particular, this disclosure relates to systems and methods for controlling (e.g., selecting) the viewpoint of a 3-D visualization of an object.

As used herein, the term "viewpoint" is the apparent distance and direction from which a camera views and records an object. A visualization system allows a user to view an image of an object from a viewpoint that can be characterized as the apparent location of a virtual camera. As used herein, the term "location" includes both position (e.g., x, y, z coordinates) and orientation (e.g., look direction vector of a virtual line-of-sight).

A 3-D visualization system may be used to display images representing portions and/or individual components of one or more 3-D models of an object within a graphical user interface. Visualization systems may be used to perform various operations with respect to the image of the object. For example, a user may use a visualization system to navigate to an image of a particular part or assembly of parts within the object for the purpose of identifying information for use in performing an inspection.

Navigating in 3-D visualization environments can be difficult and time consuming, often requiring a moderate level of skill and familiarity with the 3-D visualization controls. As one illustrative example, a 3-D visualization system may be used to visualize different types of aircraft being manufactured at a facility and data about these aircraft. More specifically, a 3-D visualization application running on a computer may display a computer-aided design (CAD) model of an aircraft comprising many parts. With some currently available visualization systems, filtering the extensive amount of data available in order to obtain data of interest concerning a particular part may be more difficult and time-consuming than desired. Some 3-D visualization systems require training and experience in order for the user to easily navigate through the CAD model of the aircraft. In particular, an interested user may find it difficult to remember or recreate a particular viewpoint of a CAD model of an aircraft (or other vehicle) to be displayed on a display screen.

Existing 3-D visualization solutions use named locations or have separate or proprietary approaches to recalling predefined viewpoints. Some 3-D visualization applications incorporate a visual query module, which is a specific capability that uses a selectable 2-D image map to instruct the application which models to load into the system. This functionality is fully integrated within the 3-D visualization application and does not use an external API to communicate with another application. Since the visual query module is built into the 3-D visualization application, it is not as flexible and cannot be integrated into separate external processes. It is limited to use within a single instance of the 3-D visualization application and cannot work between two or more networked computers (e.g., it has no interprocess communication capability). At least one 3-D visualization application has the capability to link 2-D and 3-D data, but it is a custom application that implements its capabilities in a closed way, limiting the ability to make modifications to people with access to the source code. It also does not use interprocess communication through Hypertext Transfer Protocol (HTTP) and cannot run between multiple computers.

It would be desirable to supply an open viewpoint navigation interface that anyone can create, and that anyone with a networkable device can use to run a 2-D display application to control the viewpoint in a 3-D visualization application.

SUMMARY

The subject matter disclosed in detail below is directed to systems and methods for supplying an open interface such as Hyper-Text Markup Language (HTML) web pages for viewpoint navigation control during 3-D visualization, which interface is simple to create and fast and easy to use. The viewpoint navigation control application allows users to control the viewpoint in a 3-D environment by interacting with (e.g., clicking on) a 2-D layout application.

In accordance with some embodiments, the 2-D layout comprises a web page displayed within a web browser (or other 2-D viewer with hyperlink capability), which web page comprises a multiplicity of embedded hyperlinks. In accordance with other embodiments, 2-D pick-points on a 2-D layout are used to drive the 3-D visualization viewpoint by converting selected 2-D pixel coordinates into object coordinates using JavaScript (or equivalent application) running on the web browser. In either case, in response to selection of a viewpoint by the user, the web browser incorporated in the 2-D layout application sends an HTTP communication to an external application programming interface (API) defined in the 3-D visualization application as part of a web server process. The HTTP communication contains virtual camera position and orientation data specifying the viewpoint selected by the user and to be visualized by the 3-D visualization process of the 3-D visualization application.

The technology disclosed herein allows users to select viewpoints for images to be generated by a 3-D visualization application using a simple 2-D layout application (e.g., a web browser) to send an HTTP communication. Upon receiving the HTTP communication containing selected viewpoint information, the external API outputs that viewpoint information in accordance with a non-HTTP protocol to an internal API incorporated in the 3-D visualization application. It provides a faster and more intuitive way to get to a desired virtual camera location than other stored location approaches, and also enables users who are not skilled in 3-D navigation to move the virtual camera location to any one of a multiplicity of predefined locations. Multiple 2-D layout views of the aircraft (or other target object) can be selected on the web page, for example: top, side, front views. Web pages created for this capability can have links to related 2-D views and other API functions.

Moreover, since the technology disclosed herein is built around an open standard communication process (e.g., HTTP), it enables anyone to create content for the 2-D side of the process that can work with the 3-D visualization application. The 2-D display interface can run on any device that has a web browser (Microsoft, Linux, Unix, OSX, iOS, etc. are all valid platforms) and anyone with a networkable device like a laptop computer, tablet computer, smartphone, smartwatch, or head-mounted display can use the concept disclosed herein to run a 2-D display application to control a 3-D visualization application.

One aspect of the subject matter disclosed in more detail below is a method for controlling viewpoint navigation for 3-D visualization, comprising: (a) selecting a web page; (b) displaying the web page in a first window, wherein the displayed web page has a 2-D layout, respective portions of which are associated with respective views of a 3-D model of an object having respective predefined viewpoints; (c) selecting a portion of the displayed web page associated with a view of the 3-D model of the object having a predefined viewpoint; (d) generating a command message comprising viewpoint data specifying a location of a virtual camera associated with the predefined viewpoint; (e) transferring the command message to a web server process; and (f) using the web server process to instruct the 3-D visualization process to retrieve data and display a view of at least a portion of the 3-D model of the object in a second window with the predefined viewpoint associated with the virtual camera location specified in the command message. In some embodiments, the first and second windows appear on the same display screen. The viewpoint data is expressed as hypertext comprising a hyperlink. More specifically, the viewpoint data comprises first data specifying a position of the virtual camera and second data specifying an orientation of the virtual camera. The viewpoint data may further comprise third data specifying a field-of-view of the virtual camera. The method may further comprise converting the viewpoint data into a homogeneous transformation matrix representing the predefined viewpoint and then setting the viewpoint based on that homogeneous transformation matrix.

In accordance with some embodiments of the method described in the preceding paragraph, at least some portions of the displayed web page, including the selected portion of the web page, comprise symbology indicating respective hyperlinks embedded in the web page. In accordance with other embodiments, step (c) comprises converting x and y pixel coordinates of the selected portion of the web page into X and Y coordinates of the position of the virtual camera in a frame of reference of the 3-D model of the object. In one embodiment, the converting comprises translating and scaling.

The method further comprises creating a multiplicity of files written in hypertext markup language and representing respective web pages having respective 2-D layouts, wherein each 2-D layout comprises respective portions associated with a respective set of views of a 3-D model of the object having respective predefined viewpoints.

Another aspect of the subject matter disclosed in detail below is a method for selecting a viewpoint of a visualization of at least a portion of a 3-D model of an object, comprising: (a) creating a multiplicity of files written in hypertext markup language and representing respective web pages having respective 2-D layouts, wherein each 2-D layout comprises respective portions associated with a respective set of views of a 3-D model of an object having respective predefined viewpoints; (b) using a web browser process to select a file from the multiplicity of files; (c) displaying a web page corresponding to the selected file in a first window; (d) selecting a portion of the web page displayed in step (c); and (e) generating a command message comprising viewpoint data specifying a location of a virtual camera associated with the portion of the web page selected in step (d). This method may further comprise: transferring the command message to a web server process; and using the web server process to instruct a 3-D visualization process to retrieve data and display a view of at least a portion of the 3-D model of the object in a second window with the predefined viewpoint associated with the virtual camera location specified in the command message.

A further aspect is a computer system comprising one or more processors and a non-transitory tangible computer-readable storage medium containing first executable code for executing a 2-D layout application incorporating a web browser process, second executable code for executing a 3-D visualization application incorporating a web server process, and stored digital data representing a 3-D model of an object, wherein the one or more processors are configured to be capable of performing the following operations: (a) retrieving a web page using the web browser process in response to a first user input to a first window; (b) displaying the retrieved web page in the first window, wherein the displayed web page has a 2-D layout, respective portions of which are associated with respective views of the 3-D model of the object having respective predefined viewpoints; (c) generating a hypertext command message comprising viewpoint data specifying a location of a virtual camera associated with a view of the 3-D model of the object having a predefined viewpoint in response to a second user input to the first window; (d) transferring the hypertext command message from the web browser process to the web server process; (e) retrieving at least a portion of the 3-D model of the object using a 3-D visualization process of the 3-D visualization application in response to receipt of the command message by the web server process; and (f) displaying a view of the retrieved portion of the 3-D model of the object in a second window with the predefined viewpoint associated with the virtual camera location specified in the command message.

Other aspects of systems and methods for controlling the viewpoint of a computer-generated 3-D visualization using a web browser are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
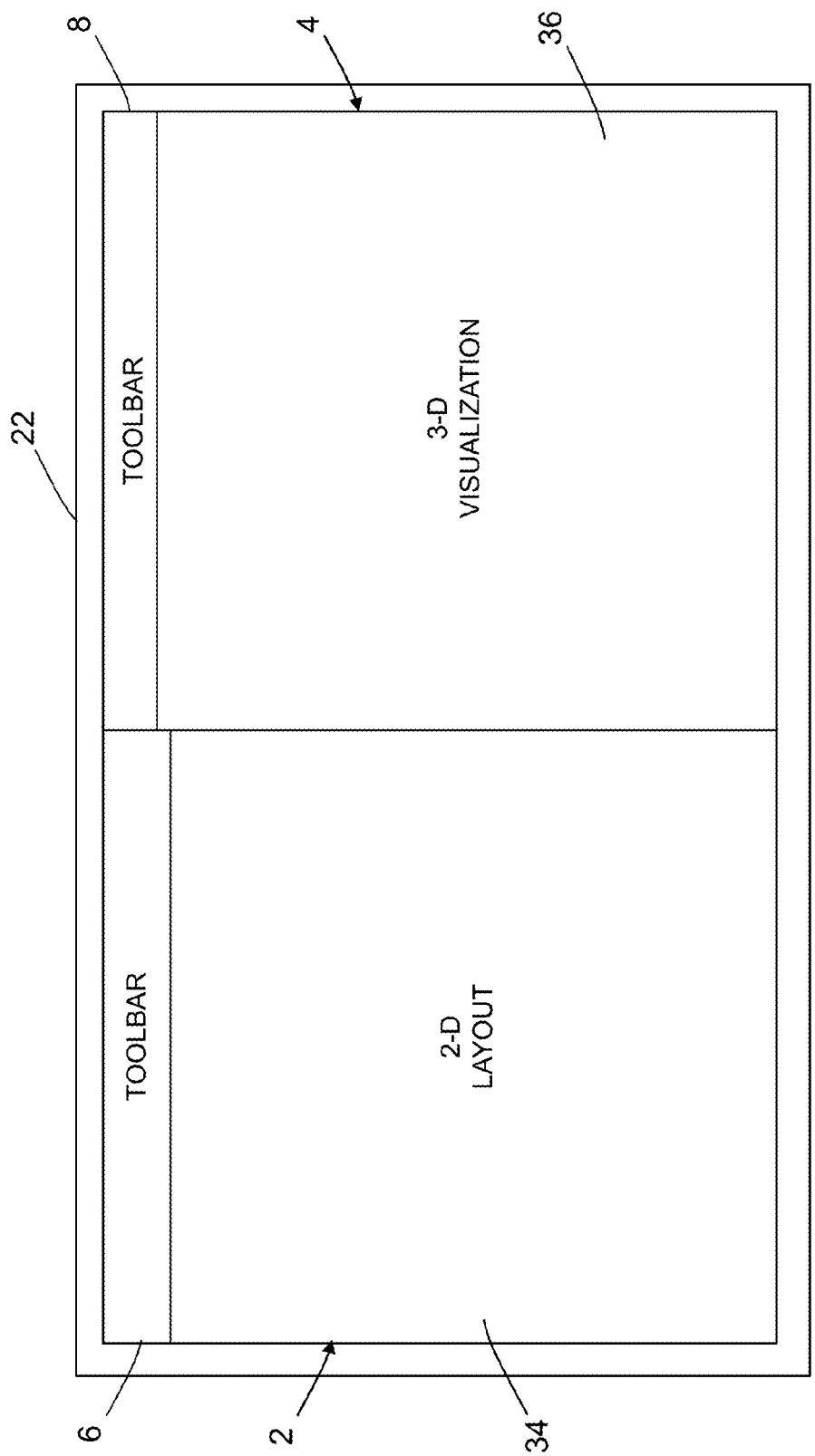
FIG. 1 is a diagram showing a display screen with two windows, one window for a 2-D layout and another window for a 3-D visualization.

Illustrative embodiments of systems and methods for controlling the viewpoint of a computer-generated 3-D visualization using a 2-D display application that can communicate using HTTP (e.g., a web browser) are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, systems and methods for controlling the viewpoint of a 3-D visualization of an aircraft or parts thereof will be described in detail below. However, the concept disclosed herein can also be used to control the viewpoint of a 3-D visualization of structures other than aircraft. More specifically, the systems and methods disclosed herein have potential for use within the aerospace industry, as well as in other industries involving complex 3-D environments, such as architectural, shipbuilding, and entertainment applications such as video games.

The methods for controlling viewpoint navigation disclosed herein involve a 2-D layout application that incorporates a web browser process and a 3-D visualization application that incorporates a web server process and a 3-D visualization process. These 2-D and 3-D applications may run on processors in respective computer systems or on respective processors in one computer system.

In accordance with some embodiments, the viewpoint navigation control method comprises the following steps. First, the user initiates an HTTP-capable 2-D display process (e.g., a web browser process) and enters an address where electronic files storing 2-D display layouts are stored. In response to entry of the address, a multiplicity of names or symbols identifying respective categories of 2-D layouts is displayed in a first window in the form of a list or a hierarchical tree structure. In response to selection of a category, a multiplicity of names or symbols identifying respective 2-D layouts belonging to the selected category is displayed in the first window. For example, a multiplicity of 2-D layouts corresponding to respective different profiles (e.g., top, side and front profiles) of a particular aircraft model (e.g., the categories are respective aircraft models) may be identified. In response to user selection of one of the names or symbols identifying one of the 2-D layouts, a web page incorporating the selected 2-D layout is displayed in the first window. Respective portions of the 2-D layout are associated with respective virtual camera locations of a 3-D model of the aircraft.

Figure 2:
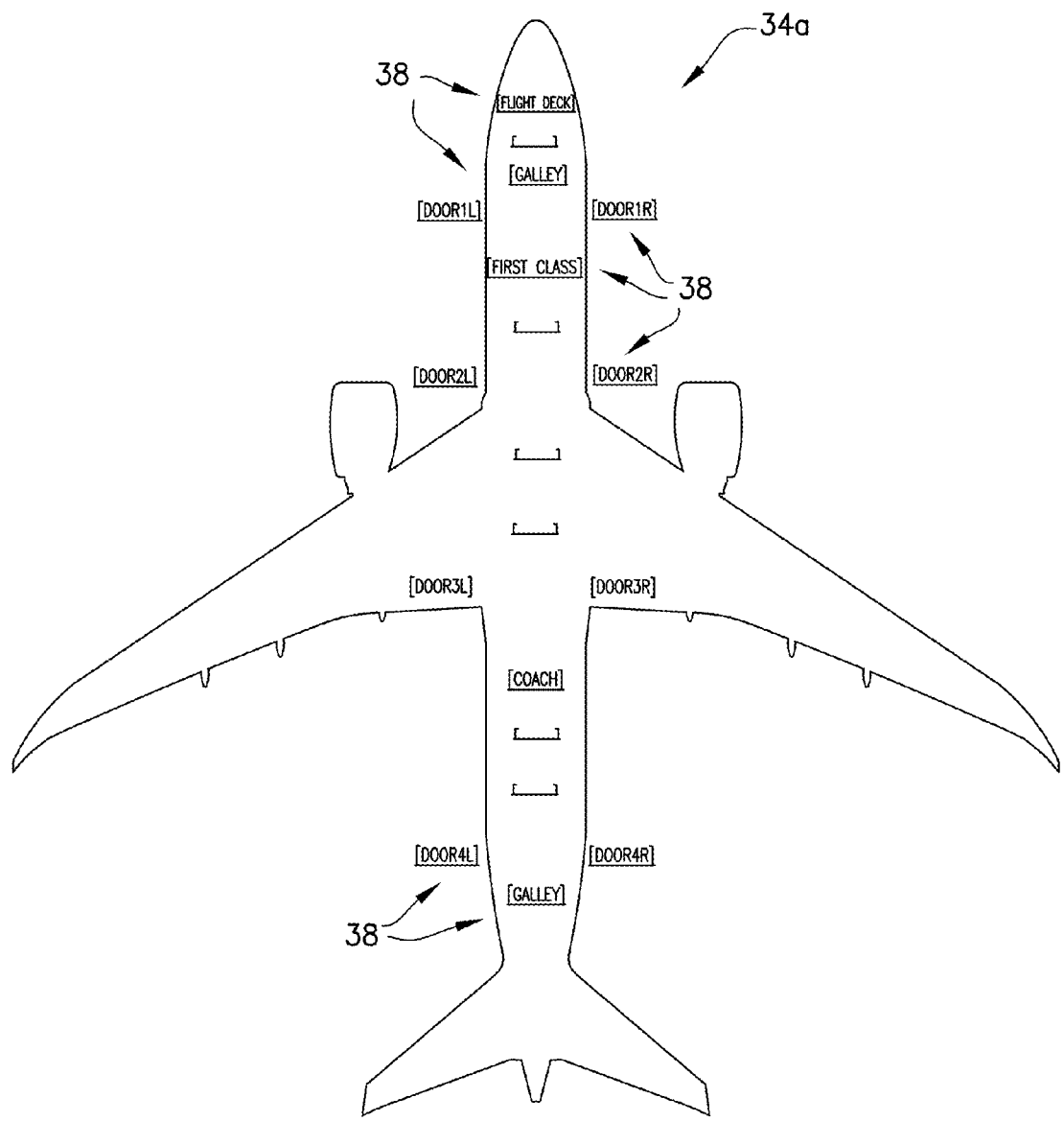
FIG. 2 is a diagram showing a top view profile of an aircraft having a 2-D layout of hyperlinks superimposed thereon for selecting the viewpoint of a 3-D visualization of an interior portion of the aircraft to appear in a different window.
Figure 3:
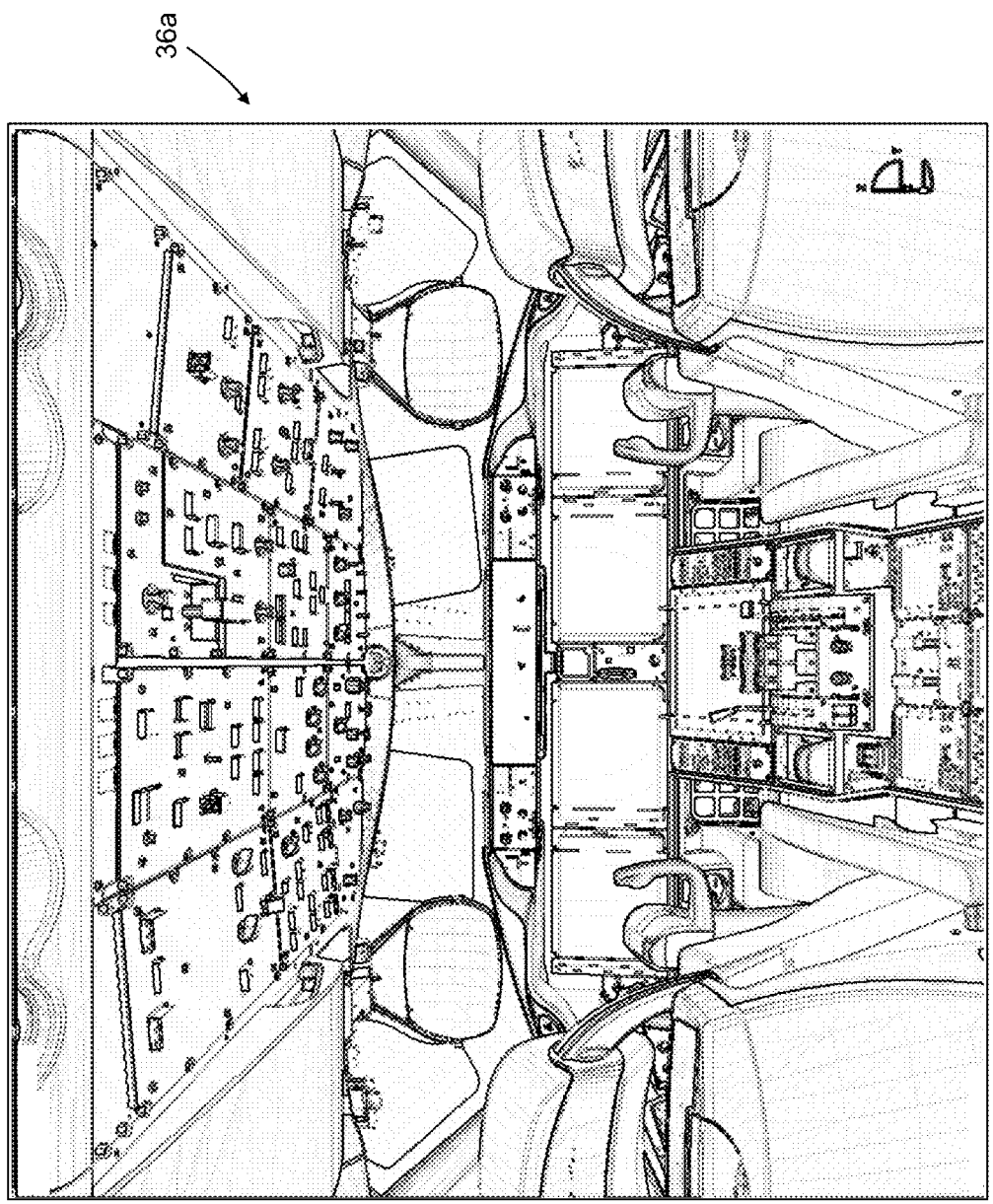
FIG. 3 is a diagram showing an example of a 3-D visualization having a predefined viewpoint that may be displayed automatically in a different window in response to the user clicking on the hyperlink named [FLIGHT DECK] that appears in the window shown in FIG. 2.
Figure 4:
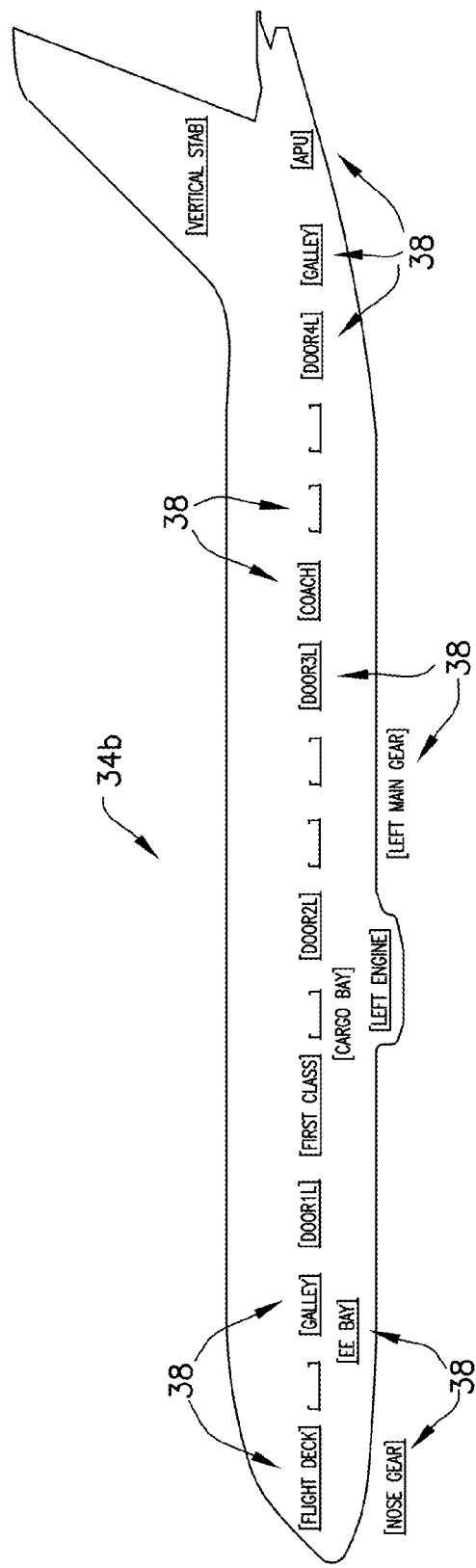
FIG. 4 is a diagram showing a left side view profile of an aircraft having a 2-D layout of hyperlinks for selecting the viewpoint of a 3-D visualization of a portion of the aircraft to appear in a different window, such as the one provided in FIG. 3.
Figure 5:
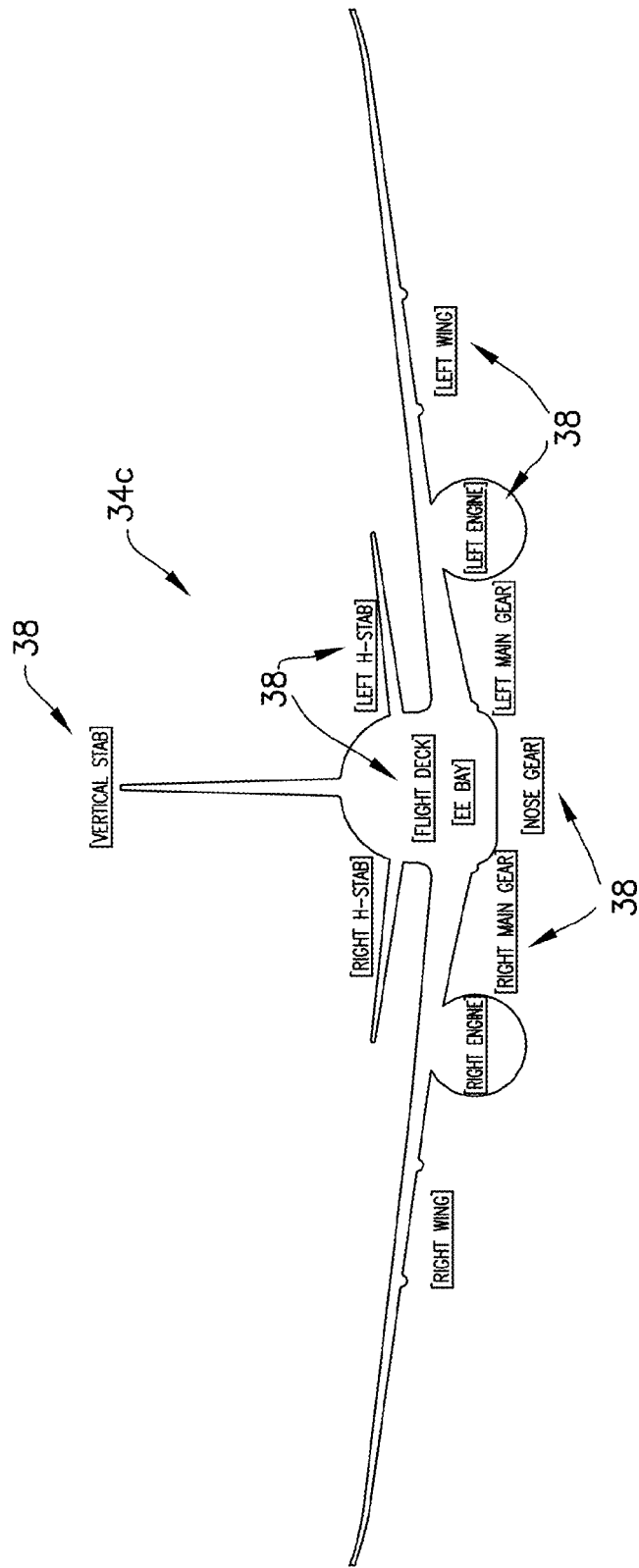
FIG. 5 is a diagram showing a front view profile of an aircraft having a 2-D layout of hyperlinks for selecting the viewpoint of a 3-D visualization of a portion of the aircraft to appear in a different window, such as the one provided in FIG. 3.

FIG. 1 shows a display screen 22 with two windows, one window 2 for displaying a first toolbar 6 and a 2-D layout 34 and another window 4 for displaying a second toolbar 8 and a 3-D visualization 36. Three examples of a 2-D layout are shown in FIGS. 2, 4 and 5. One example of a 3-D visualization is shown in FIG. 3.

For the purpose of illustration, FIG. 2 shows a top view profile of an aircraft having a 2-D layout 34a of hyperlink symbology 38 superimposed thereon. Each instance of hyperlink symbology 38 corresponds to a respective hyperlink embedded in the web page. In this example, some of the hyperlink symbols 38 appearing in FIG. 2 include the name of a respective part or location in the aircraft, including the following: [FLIGHT DECK], [GALLEY], [DOOR1L], [DOOR1R], [FIRST CLASS], [DOOR2L], [DOOR2R], [DOOR3L], [DOOR3R], [COACH], [DOOR4L] and [DOOR4R]. Any one of these hyperlinks can be selected by placing a mouse cursor over the corresponding symbology and clicking, which action enables a user to select the viewpoint of a 3-D visualization of an interior portion of the aircraft to be displayed in a different window, such as is shown in FIG. 3.

In response to user selection of a 3-D viewpoint, a command message is generated in hypertext. The hypertext message comprises a string of data expressed in hypertext. The data in the string comprises first data specifying a position of a virtual camera associated with the selected portion of the web page and second data specifying an orientation of the virtual camera. Optionally, the data in the string may further comprise third data specifying a field-of-view of the virtual camera. The command message is then transferred from the web browser process of the 2-D application to the web server process of the 3-D application.

In response to receipt of the command message, the web server process instructs the 3-D visualization process to retrieve data and display at least a portion of the 3-D model of the object in a second window with a viewpoint characterized by the virtual camera location specified in the command message.

For the purpose of illustration, it will be assumed that a user has selected the hyperlink named [FLIGHT DECK], which appears in FIG. 2. FIG. 3 shows a 3-D visualization 36a of a flight deck of the aircraft from a predefined viewpoint which, in response to the user clicking on the hyperlink named [FLIGHT DECK], is displayed automatically in the second window.

As previously mentioned, the initial list of selectable 2-D layouts may include a multiplicity of 2-D layouts corresponding to respective different profiles (e.g., top, side and front profiles) of an aircraft. FIG. 4 shows a left side view profile of an aircraft having a 2-D layout 34*b* of hyperlink symbology 38 for selecting the viewpoint of a 3-D visualization of a portion of the aircraft to appear in the second window. In this example, some of the hyperlink symbols appearing in FIG. 4 include the following: [FLIGHT DECK], [NOSE GEAR], [EE BAY], [GALLEY], [DOOR1L], [FIRST CLASS], [CARGO BAY], [LEFT ENGINE], [DOOR2L], [LEFT MAIN GEAR], [DOOR3L], [COACH], [DOOR4L], [APU] and [VERTICAL STAB]. In response to a user clicking on one of the hyperlinks seen in FIG. 4, a 3-D visualization of a corresponding portion of the aircraft from a predefined viewpoint will be automatically displayed in the second window. For example, if the user clicks on the hyperlink named [FLIGHT DECK], the 3-D visualization 36*a* of a flight deck of the aircraft shown in FIG. 3 may be displayed.

Similarly, FIG. 5 shows a front view profile of an aircraft having a 2-D layout 34*c* of hyperlink symbology 38 for selecting the viewpoint of a 3-D visualization of a portion of the aircraft to appear in the second window. In this example, some of the hyperlink symbols appearing in FIG. 5 include the following: [FLIGHT DECK], [NOSE GEAR], [EE BAY], [LEFT WING], [LEFT ENGINE], [LEFT MAIN GEAR], [RIGHT WING], [RIGHT ENGINE], [RIGHT MAIN GEAR], [RIGHT H-STAB], [LEFT H-STAB] and [VERTICAL STAB].

FIGS. 2, 4 and 5 all represent sectional views at a particular location. For example, FIG. 5 represents a view with labeled items located in the front of the aircraft, but other sections could also be annotated. For example, if the section location were in the middle of the aircraft, then hyperlink labels for the passenger compartments or cargo bay could be listed. To select these other representations, separate HTML pages could be created for each section. Alternatively, a control input (like a slider bar) could be added to the page to allow users to scroll through the various sections.

Figure 6:
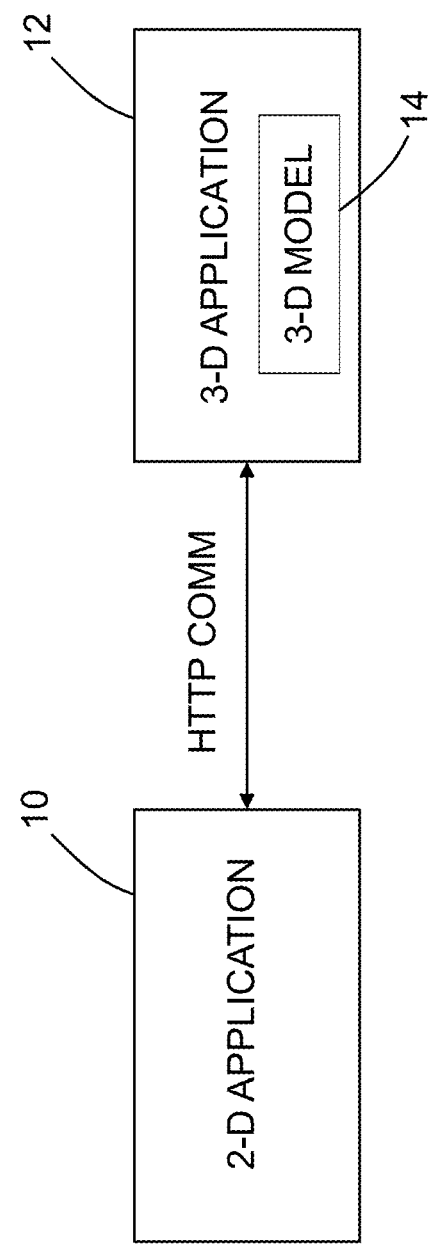
FIG. 6 is a block diagram showing an architecture in which a 2-D layout application and a 3-D visualization application communicate using Hypertext Transfer Protocol (HTTP) for the purpose of selecting the viewpoint of the 3-D visualization.

FIG. 6 is a block diagram showing an architecture in which a 2-D layout application 10 and a 3-D visualization application 12 communicate using Hypertext Transfer Protocol (HTTP) for the purpose of enabling a user to select the viewpoint of the 3-D visualization of at least a portion of a 3-D model 14 (e.g., a CAD model) of an aircraft or other object. The 3-D model 14 of the aircraft is stored in a non-transitory tangible computer-readable storage medium. The 3-D visualization process of the 3-D visualization application provides a graphical representation of aircraft components in their physical form. As previously described, the HTTP communication may include a hypertext command message comprising a string of data specifying the location of a virtual camera (i.e., specifying the viewpoint). This command message is sent by a web browser process incorporated in the 2-D layout application 10 to a web server process incorporated in the 3-D visualization application 12.

Figure 7:
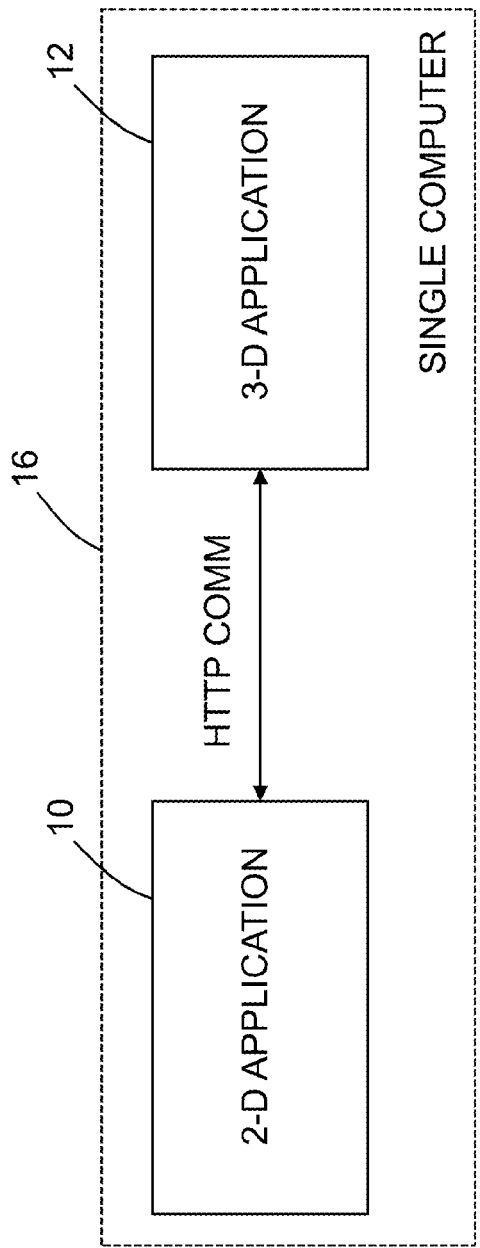
FIG. 7 is a block diagram showing one embodiment of the architecture shown in FIG. 6. In this embodiment, the 2-D layout application and the 3-D visualization application run on a single computer having respective windows for displaying the 2-D layout and the 3-D visualization.

In accordance with some embodiments, the 2-D layout application 10 and the 3-D visualization application 12 run on the same computer. FIG. 7 shows the 2-D layout application 10 and the 3-D visualization application 12 running on a single computer 16 having a display interface with respective windows (not shown) for displaying the 2-D layout and the 3-D visualization on the same screen.

Figure 8:
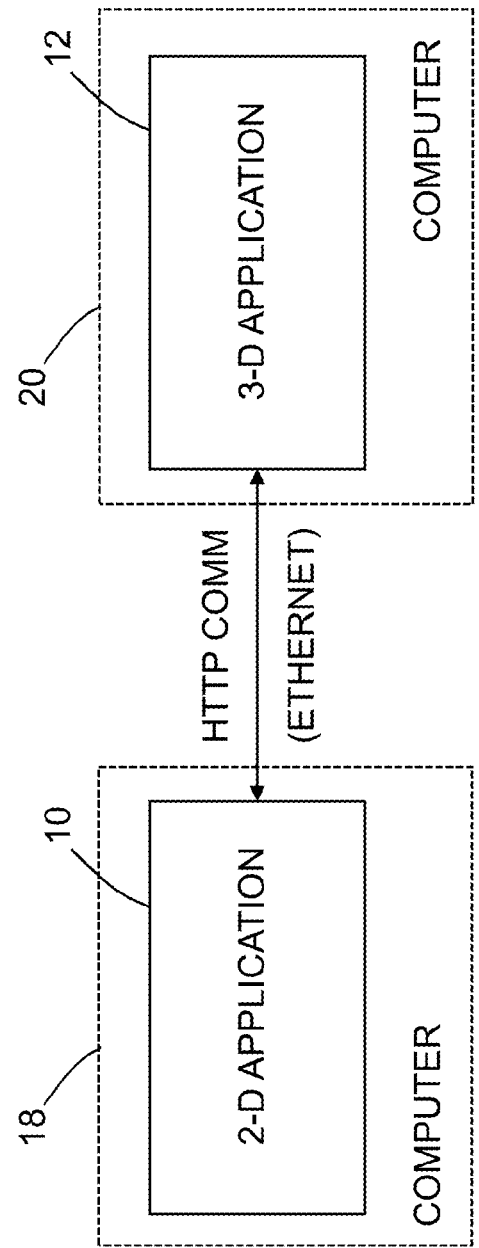
FIG. 8 is a block diagram showing another embodiment of the architecture shown in FIG. 6. In this embodiment, the 2-D layout application and the 3-D visualization application run on separate computers which communicate via an Ethernet connection.

In accordance with other embodiments, the 2-D layout application 10 and the 3-D visualization application 12 run on different computers. FIG. 8 shows the 2-D layout application 10 running on a first computer 18 and the 3-D visualization application 12 running on a second computer 20. In this configuration, the HTTP communication is via an Ethernet connection. Each computer has a respective display interface. Computer 18 comprises a display interface having a window (not shown) for displaying the 2-D layout, while computer 18 comprises a display interface having a window (not shown) for displaying the 3-D visualization.

Figure 9:
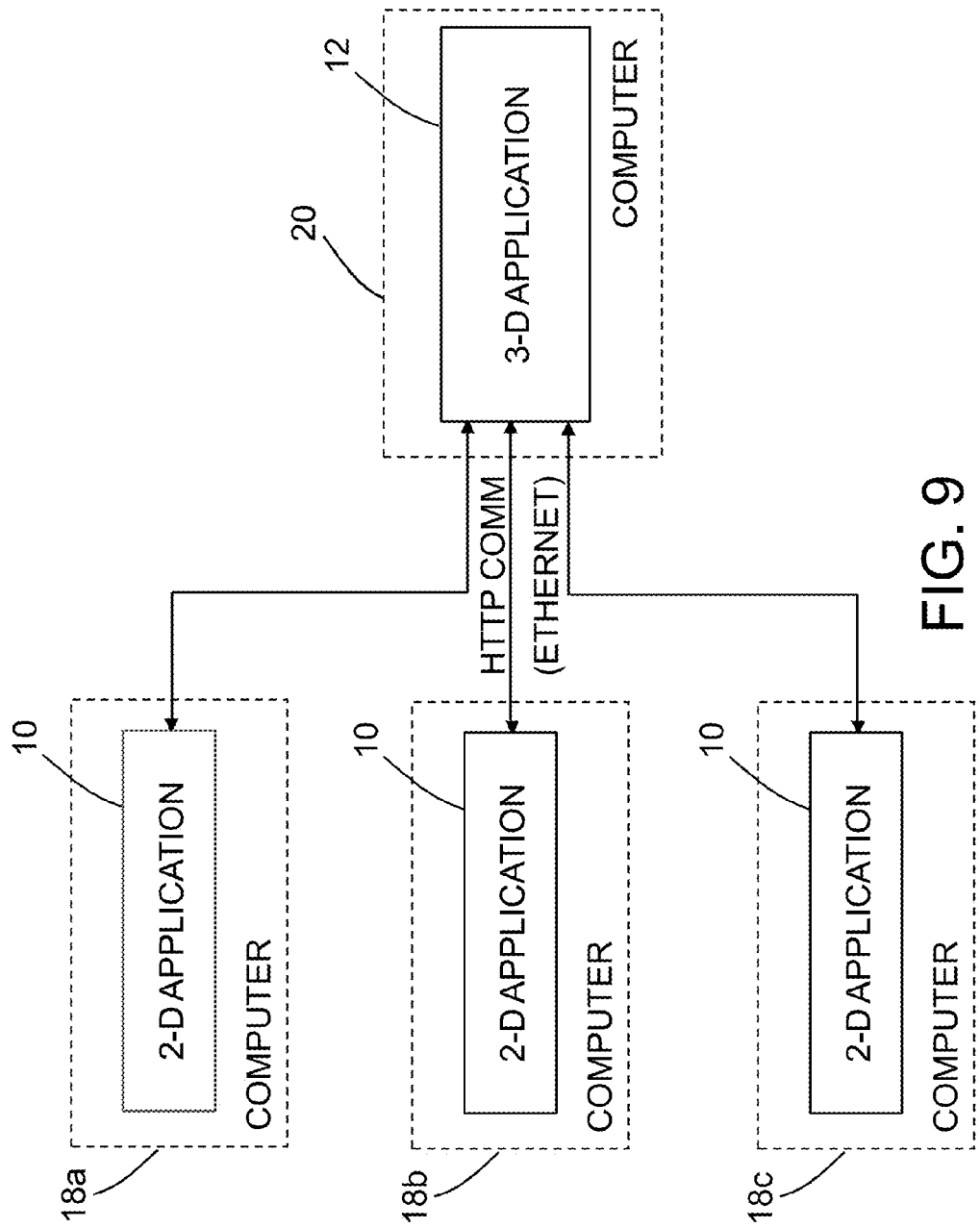
FIG. 9 is a block diagram showing an architecture in which multiple clients (in this example, multiple computers running respective 2-D layout applications) communicate with a server (in this example, a single computer running a 3-D visualization application) via respective Ethernet connections.

FIG. 9 is a block diagram showing an architecture in which three computers 18*a*-18*c* running respective 2-D layout applications 10 are able to communicate with a single computer 20 running a 3-D visualization application 12 via respective Ethernet connections. In accordance with the architecture depicted in FIG. 9, a web server process incorporated in the 3-D visualization application 12 serves a multiplicity of clients which take the form of respective web browser processes incorporated in the respective 2-D layout applications 10. The respective 2-D layout applications 10 may be the same or different. For example, each 2-D layout application 10 may be configured to display lists and 2-D layouts that reflect the structures of different types of aircraft, e.g., different aircraft models. For example, computers 18*a*-18*c* may be situated at different manufacturing facilities or at different positions inside the same manufacturing facility. Computers 18*a*-18*c* may communicate with computer 20 via an Ethernet local area network. In alternative embodiments, the HTTP communications between the computers may be via the Internet.

Figure 10:
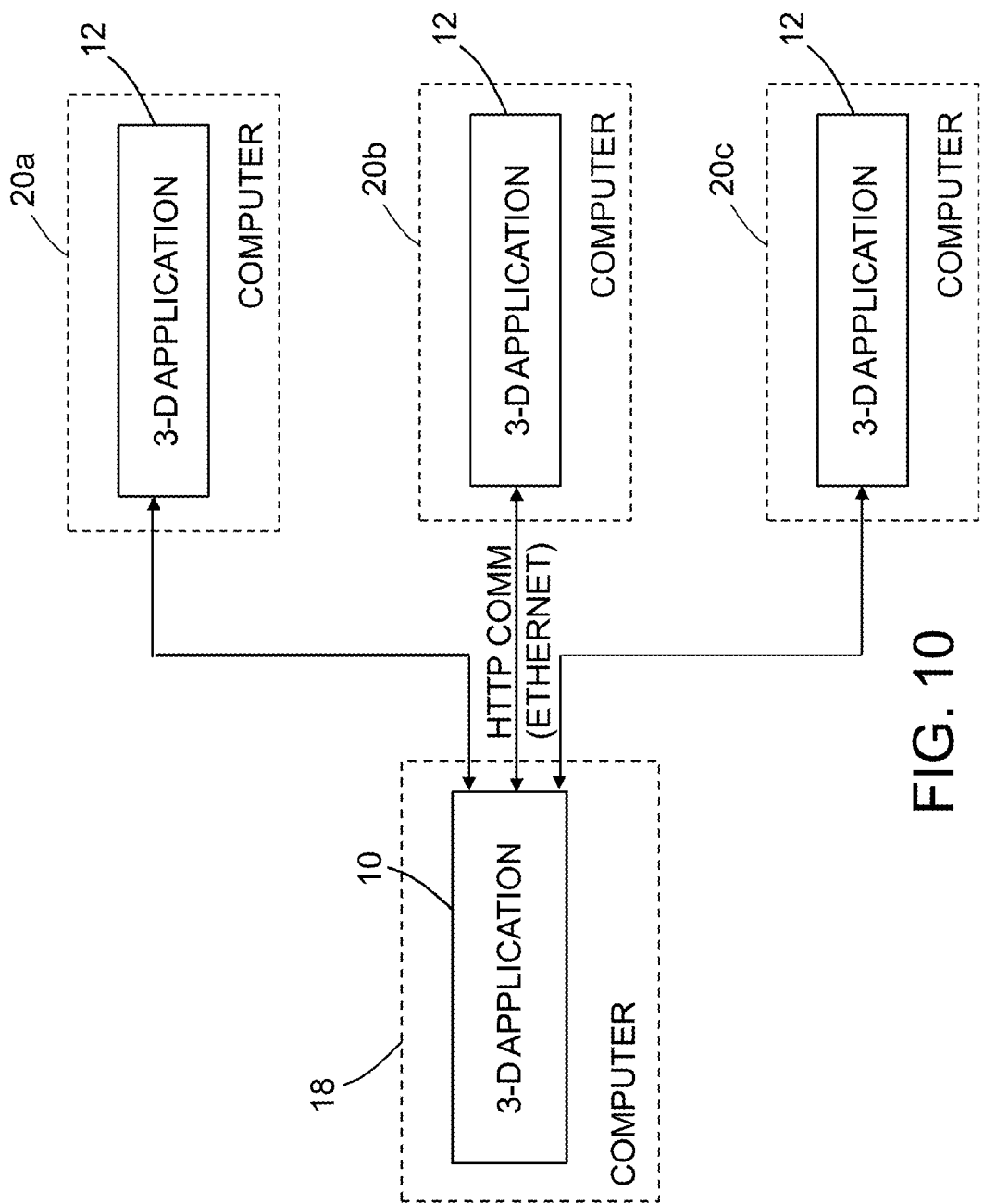
FIG. 10 is a block diagram showing an architecture in which a client (in this example, a computer running a 2-D layout application) communicates with multiple servers (in this example, multiple computers running respective 3-D visualization applications) via respective Ethernet connections.

FIG. 10 is a block diagram showing an architecture in which a single computer 18 running a 2-D layout application 10 is able to communicate with a multiplicity of computers 20*a*-20*c* running respective 3-D visualization applications 12 via respective Ethernet connections. In accordance with the architecture depicted in FIG. 10, a web browser process incorporated in the 2-D layout application 10 may send command messages to any one of three servers which take the form of respective web server processes incorporated in the respective 3-D visualization applications 12. The respective 3-D visualization applications 12 are preferably different. For example, each 3-D visualization application 12 may comprise a respective 3-D visualization process which is configured to display graphical representations of the components of a respective different aircraft model in their physical form. Computer 18 may communicate with computers 20*a*-0*c* via an Ethernet local area network. In alternative embodiments, the HTTP communications between the computers may be via the Internet.

The computer 20 may be generally configured to execute one or more computer programs, including a 3-D visualization application 12 configured to render for display a digital 3-D model 14 of a structural product composed of a plurality of parts, such as a 3-D computer-aided design (CAD) or other similar model (sometimes referred to as a solid model). The 3-D visualization application 12 may render the digital 3-D model 14 in accordance with a number of techniques, such as those employed by CAD viewers and other 3-D visualization applications. These types of applications use a graphics application program interface (API), such as OpenGL or Direct3D, to render sequences of images representing the 3-D models contained within a virtual environment. Some examples include virtual reality modeling language (VRML) viewers, X3-D viewers, Java 3-D viewers, QuickTime virtual reality (VR), QTVR, Unity, Unreal Engine or the like.

In one example, the 3-D model 14 may represent the structural product as a collection of "primitives" such as edges, faces, points (e.g., vertices) and the like, which may be arranged into polygons or other arithmetically-derived structures to represent the geometry of surfaces, volumes or parts of the respective structural product. The structural product may be defined by a "boundary" representation, or collection of polygons that demarcate the space occupied by the structural product, which may include sub-collections of polygons that demarcate spaces occupied by respective parts of the structural product. Each of these sub-collections of polygons may be referred to as a 3-D object that corresponds to part of the structural product in the 3-D model. For some structural products, the 3-D model may use hundreds of thousands, millions or even billions of polygons, which may be arranged in thousands of sub-collections of polygons (3-D objects) corresponding to several thousands of parts.

The 3-D model 14 may include information that may indicate a design type of the aircraft model, such as an art concept, preliminary design, released design or the like. The 3-D model may include information (e.g., name, number, quantity, source, material, 3-D location, related parts) regarding the structural product and/or one or more of its parts. The 3-D model may further include a model-based definition of the structural product, product manufacturing information such as geometric dimensions and tolerances, material specifications, component lists, process specifications, inspection requirements or the like. Additionally or alternatively, for example, the 3-D model may include information specifying various manufacturing, inspection, maintenance and/or repair procedures, each of which may include one or more tasks involving (user) interaction with one or more parts of the structural product. In various examples, this additional information may be provided directly in the 3-D model or in metadata associated with the 3-D model.

The 3-D visualization application 12 is configured to render the digital 3-D model 14 of the structural product in a scene in which the digital 3-D model 14 (or portions thereof) is observed from a particular point of view (i.e., viewpoint) corresponding to a virtual camera location in the frame of reference of the aircraft. The 3-D visualization application 12 may open or otherwise initially render the 3-D model 14 observed from a home virtual camera location (i.e., home viewpoint), such as a viewpoint in which the whole of the structural product is observed. The 3-D visualization application 12 may then receive user input (as disclosed hereinabove) to navigate the 3-D model 14 through a number of different operations such as pan, tilt and/or zoom operations, which may move the viewpoint of the 3-D model 14 from its home to another viewpoint. In this manner, the scene may be focused on a particular portion of the aircraft.

Information regarding the part may also be similarly acquired from the 3-D model 14 or metadata associated with it. As mentioned above, this information may include, for example, the name and/or number of the part, the 3-D location (i.e., position and orientation) of the part, information specifying procedure(s) involving the part, and the like.

In a case where the 2-D and 3-D applications are running on the same computer, the 2-D layout is displayed in a first window and the 3-D visualization of the model of the object is displayed in a second window. The user can use a mouse to move a cursor to a desired position in the first window and then select a predefined 3-D viewpoint by clicking. In response to that selection, the selected viewpoint will be displayed in the second window. If the user then moves the cursor into the second window, the user can cause the first selected predefined viewpoint to change using pan, tilt and zoom functions. By returning the cursor to the first window, the user can then select a different predefined viewpoint. In response to that selection, the second selected predefined viewpoint will be displayed in the second window. If the user moves the cursor back into the second window, the user can change the second selected viewpoint using the pan, tilt and zoom functions. This process can continue until all of the available predefined viewpoints have been selected in sequence and viewed, enabling the user to present a virtual tour of the object.

In accordance with one advantageous implementation, the web server process incorporated in the 3-D visualization application incorporates an external API. Developers of the 2-D layout application would then be able to create functions (such as setting a viewpoint) that will generate command data strings of data sent through the HTTP communication connection that comply with the 3-D application API format. The data in each HTTP command data string includes x, y, z position and an orientation (look direction and up vector) of a virtual camera. Data specifying the field-of-view of a virtual camera may also be included.

One example of such a hyperlink is as follows:
<a href="http://localhost:12345/?Api=InProc.MoveCamera&cameraId=0&cx=200.0&cy=-0.0&cz=260.0&Ix=-2.0&Iy=0.0&Iz=-1.0&ux=0.0&uy=0.0&uz=1.0&Api=InProc.Update">[FLIGHT DECK]</a>

This command data string changes the virtual camera location and tells the 3-D application to process the update. The command is displayed to the user in the 2-D application using the text: "[FLIGHT DECK]"—which is the hypertext link. This link can be any text or image that the developer decides is appropriate for the application the developer is creating.

Another sample hyperlink that sends commands (to change the viewpoint) that are received by the web server process built into the 3-D visualization application is the following:
<a href="http://localhost:12345/?Api=InProc.MoveCamera&cameraId=0&cx=400.0&cy=-54.0&cz=250.0&Ix=0.0&Iy=-3.0&Iz=-1.0&ux=0.0&uy=0.0&uz=1.0&Api=InProc.Update">[1A]</a>

In this sample command data string, a specific seat location "[1A]" on the aircraft is being used for the displayed text of the hyperlink. In the alternative, the 2-D application can also include a 2-D seat icon (image) that looks like a seat.

Images, text, or both simultaneously can be used for the display element appearing in the window for the 2-D layout application, but whatever form the display element is in, by clicking it with the mouse, the user activates the command associated with it.

The command data strings sent to the 3-D application by the 2-D application contain the required data in the required format as defined in the 3-D application's API specification. Such commands also conform to HTTP requirements for communication between a client application (e.g., a web browser process in the 2-D application) and the web server process in the 3-D application.

In a typical application, such as a web page viewed in a web browser, the API command data string may be embedded in a standard hyperlink definition. In the case of a web page viewed in a web browser, the web page content may be automatically generated (which is usually the case for more complex applications). Scripting/programming languages such as PHP, JavaScript, ASP.NET and others can be used to dynamically create web pages. In the alternative, the web pages may be coded manually.

The external API incorporated in the web server process of the 3-D visualization application is exposed for use by external applications (such as the 2-D layout application). Once the data string is received by the external API processing function in the 3-D visualization application, it is processed internally by other non-external API functions to execute the desired capability (such as setting the camera viewpoint command). These internal functions do not use HTTP to communicate with each other. HTTP is only used to get the data transferred between the two applications.

At the lowest level in the 3-D graphics processing, the camera viewpoint may be represented as a 4×4 homogeneous transformation matrix (most common) or any other available format. The command data string that was transferred to the 3-D visualization application by way of HTTP is converted to the matrix form by internal functions within the 3-D application. This is true for the camera viewpoint function. Other functions of the external API may send data that can be used without conversion.

The reference to "localhost" in the command data string is a standard way of referring to the Internet Protocol (IP) network address of local computer. Alternatively, this field can be the IP address assigned to the computer. It can also be a name (like google.com) that can be resolved by Domain Name System (DNS). In general, this part of the command data string is used in order for the client (e.g., the 2-D application) to find the network location of the server (e.g., the 3-D application). The term "localhost" can be used when both the client and server are running on the same computer, but when they are running on different computers, then one of the more explicit IP address forms will need to be used.

Still referring to the sample hyperlinks given above, "InProc" is the name of a class of methods contained within the external API. In some implementations, other classes may be included in the external API. "InProc.MoveCamera" is the actual full name of the API method that sets the camera location. Another method is "InProc.SetFov", which can be used to set the field-of-view of the virtual camera. The "&cameraId=0" in the sample hyperlinks refers to the specific identifier for camera number 0. The action for the command "Api=InProc.MoveCamera&cameraId=0" means that only camera 0 is being moved and not any of the other cameras.

The variables "cx=", "cy=" and "cz=" refer to the x, y, z coordinate position of the virtual camera in the Cartesian space defined in the 3-D virtual environment. The variables "lx=", "ly=" and "lz=" define the look direction vector that defines the direction in which the camera is pointed. The variables "ux=", "uy=" and "uz=" define the up vector, which is a vector that is orthogonal to the look direction vector (used to define the twist along look direction). All of the foregoing variables are used to define the camera location.

The particular syntax of the sample command data strings given above is specific to one implementation. The syntax does not have to appear in this exact form in other possible implementations.

As used herein, the phrase "process the update" refers to processing an update step in the implementation of an event-driven 3-D visualization application. In this type of application (which is very common for graphical applications), the 3-D rendering only updates the image displayed on the screen when something changes in the environment, and the way in which the 3-D visualization application processor determines that something has changed is to look for an action event. In a standard application where the processor is looking for inputs from the user, these events could be mouse movements, keyboard button presses, or events from other devices (such as a gamepad etc.). When any of these types of interactive inputs are processed, the operating system automatically creates an action event. In one embodiment of the 3-D visualization application, the graphics update loop is looking for action events to trigger an update of the display, but in situations where changes are made to the state of the system without an interactive action event, which is what is happening with data coming from the external API, the 3-D visualization application needs to be commanded to perform an update of the display. That is what the "InProc.Update" command does.

Sometimes it may be useful to wait until several commands are received from the 2-D application before the 3-D application performs an update. For example, the user may want to change the camera location and also change the field-of-view, and then tell the system to process the update. This can be accomplished by putting both commands in the same data string with the update command at the end. In the alternative, the two commands can be inserted into separate data strings, which are sent separately, and then an update command can be sent after the first two commands have been sent.

Figure 11:
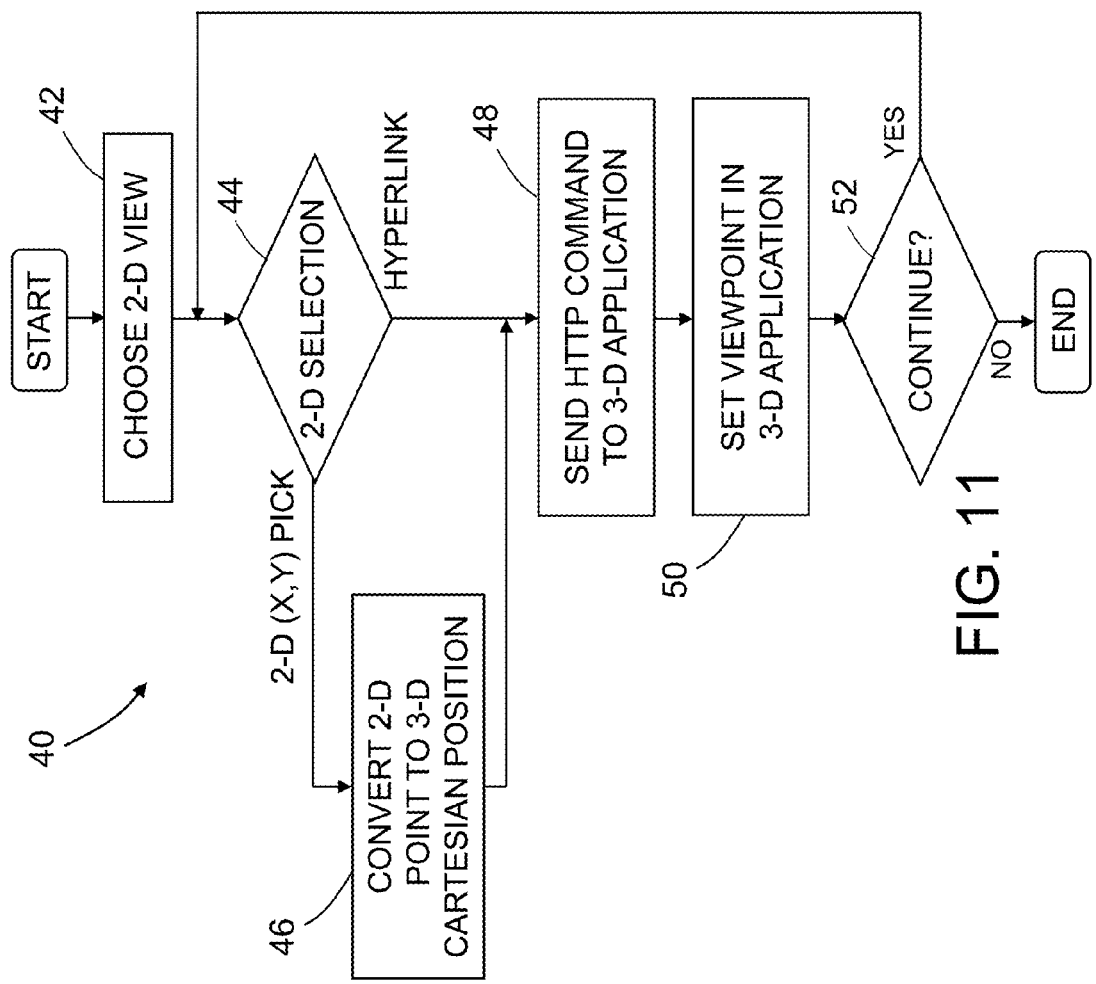
FIG. 11 is a flowchart identifying steps of a method for controlling the viewpoint of a computer-generated 3-D visualization.

FIG. 11 is a flowchart identifying steps of a method 40 for controlling the viewpoint of a computer-generated 3-D visualization. As previously described, the user uses a web browser process incorporated in the 2-D layout application to choose a particular 2-D layout associated with a particular 3-D model of the object (e.g., an aircraft) of interest (step 42). The selected 2-D layout is displayed. The user then is free to select a particular region on the displayed 2-D layout (step 44).

The graphical depiction of the 2-D layout is such that the user can visually discriminate symbology or regions associated with respective parts of the object to be visualized. In accordance with one method, symbols (e.g., text or icon images) indicating embedded hyperlinks are clicked on by the user. Each embedded hyperlink is a string of data comprising viewpoint position and orientation data and commands. In response to hyperlink selection, an HTTP command message that includes the string of data is automatically sent to the 3-D visualization application (step 48). If the 2-D selection is not on a hyperlink, then the web browser is configured to determine the x and y screen coordinates measured in pixels (either from a discrete event, such as a mouse button press, or continuously as the user is moving the mouse around) and then convert those x and y pixel coordinates into X and Y coordinates in a Cartesian frame of reference associated with the 3-D model of the object (step 46) using a scaling and offsetting process programmed into the JavaScript or equivalent application running on the client web browser. Only the X and Y data would come directly from the 2-D pick, the other values can be either constant, such as the Z value (which could be set to a fixed distance from the floor) and the up vector (which would be perpendicular to the floor), or the values can be based on the X,Y pick. For example, the look direction vector could be based on assumptions about features in the specific location. Alternatively, the 2-D application could be set up to use two pick points to set the position and then the look direction. This could be done with two separate picks or a single mouse button click using a press down, move mouse, then release, where the down action sets the position and the up action sets the look direction. After such a 2-D selection (step 44), the web browser process populates the appropriate variables in the data string of the HTTP command message to be sent to the 3-D visualization application (also part of step 46). The HTTP command is then sent to the 3-D application (step 48).

Regardless of which 2-D selection method is used, the 3-D visualization process is configured to set the specified viewpoint and then display a view of a portion of the 3-D model of the aircraft, which view is from the vantage point of a virtual camera located as specified by the viewpoint setting (step 50). After the selected 3-D view has been displayed, the user determines whether the process should continue or not (step 52). If the process should continue, then the user returns to step 44. If the process should not continue, then the process is terminated.

The scaling and offsetting process mentioned above is based on the relative x-scale and y-scale of the screen pixels to the physical coordinates of the object to be visualized. For example, if the width (x) of the 2-D image is 1600 pixels and the height (y) of 2-D image is 1510 pixels, and from the 3-D model the length (X) of the aircraft is 2910 inches and the width (Y) of the wing span of the aircraft is 2550 inches, then the 2-D application can be configured to convert the x pixel value into Y coordinates by using the scale factor of 2550/1600=1.594, and scale the y pixel value into X coordinates by using the scale factor of 2910/1510=1.927. Any coordinate system translational offsets associated with where the images are on the screen would also be added. For one example, assume that the origin offset in the image was x,y=(−800, 10) pixels. Then, if a point of interest in the 2-D web browser had pixel coordinates of (870, 265), that would result in an X aircraft coordinate of (265+10)*1.927=529.9 inches and a Y aircraft coordinate of (870−800) *1.594=111.6 inches. Other types of offset, such as rotational offset, can also be addressed by processes running a 2-D display application.

It is also possible to do the reverse, which is to pick a point on the 3-D visualization of the model of the aircraft (or any other point of interest in the 3-D virtual environment), convert that into x and y pixels, and then display an indicator marker at the corresponding spot on the 2-D web page.

In summary, the 2-D layout provides a graphical representation of components of a system but does not necessarily have dimensionally accurate information. In contrast, the 3-D view provides a graphical representation of the components in a spatially accurate form. The process described above provides an interface based on 2-D layouts to control the virtual viewpoint in a 3-D virtual environment through a HTTP-based connection between the two applications. The 2-D layouts can be associated with a specific instance of the object (like an aircraft line number) or the layouts can be in a general form. Selection items can be object, feature, or landmark related, such as specific seat numbers, galley locations, or specific doors. Selection points can also be location specific, such as an exact X, Y, Z location stored as a hyperlink. Alternatively, 2-D pick-points on the 2-D layout can be used to drive the 3-D visualization viewpoint by converting the 2-D pixel coordinates into object coordinates using JavaScript (or equivalent application) running on the web browser.

A manual authoring process can be used to generate and store the web pages used by the 2-D layout application. This manual process involves selecting locations in a 3-D model of the object (e.g. aircraft) and exporting a 2-D layout to be used in the future. For example, the hyperlinks can be generated from location data for a particular model of aircraft. The 3-D visualization application has the ability to determine the position and orientation of the virtual camera location for each 3-D view. The location data for each 2-D layout can be acquired by moving around (e.g., changing the viewpoint) in the 3-D environment and selecting sets of data representing the coordinates and angles of the virtual camera location when the view being observed is judged to be of sufficient interest or value to merit re-display at a later time. In the alternative, an automated application can be used to generate the hyperlinks by retrieving location data from an attribute database. In either case, the selected locations can be stored in an .html file from which a corresponding web page displaying a 2-D layout can be constructed. All such .html files can be stored in a non-transitory tangible computer-readable storage medium accessible by the web browser incorporated in the 2-D layout application.

The concepts disclosed herein are directly applicable to commercial aircraft manufacturing and service to provide 3-D visualization application users an efficient and easy way of navigating 3-D environments. It has potential application in 3-D design reviews, as well as in support and services areas. In addition to using 2-D images of the full aircraft, it can also be used for sub-assemblies such as a wing or a wiring diagram. In accordance with the embodiments disclosed above, the 2-D layouts are converted to 3-D views using translation and scaling, but for other embodiments, the 2-D layout can be an abstract representation (e.g., plumbing, pneumatic, hydraulic, or electronic wiring diagrams) that does not have a direct 1:1 mapping of the 2-D layout to the 3-D locations.

In accordance with one enhancement, the web pages accessible by the web browser in the 2-D layout application may be organized in accordance with a hierarchical flip-book type of approach. This approach combines multiple 2-D layouts into tree-like structures that would allow users to pick a 2-D layout that they want to work with. Such a hierarchical tree structure enables an easy-to-use interface that allows the user to scroll through lists (or up/down in a hierarchy) to help the user find the desired viewpoint. In a similar way, the scrollable list could comprise frames in a 2-D animation.

Another enhancement is to create 2-D layouts based on tasks (or work breakdown structure). This would present 2-D layouts with different labels based on what the specific user wants to see. For example, electricians might want locations of junction boxes on an aircraft to be listed, while someone from an aircraft interiors group might want locations of seats or overhead bins. These could be presented as layers in which one or more could be shown on the same 2-D layout, perhaps in different colors.

A third enhancement is to create 2-D layouts based on a timeline of when specific items will be worked. That timeline may be represented by shop orders stored in a shop order database. These temporal representations could work like the aforementioned flip-book or layers concepts, or with an interactive slider (GUI element) to assist with the selection. Time ranges could also be represented with different colors used to represent different installation times.

In accordance with another enhancement, the hyperlinks on web pages for the 2-D display application can be enhanced to support alternate view orientations (i.e., look directions) using icons or text with additional elements (like arrows) indicating alternate pre-defined look directions.

In accordance with a further enhancement, the web pages can be setup to support additional multi-action sequences besides the viewpoint and FOV commands disclosed above (similar to macros). These can include setting lighting, clipping planes, moving objects, displaying messages, and similar commands.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit). Examples of suitable computer systems include a smartphone, tablet computer, laptop computer, desktop computer, workstation computer, smart watch, head-mounted display or other wearable displays. The computer system may include one or more of each of a number of components such as, for example, a main processor connected to a graphics processor.

Figure 12:
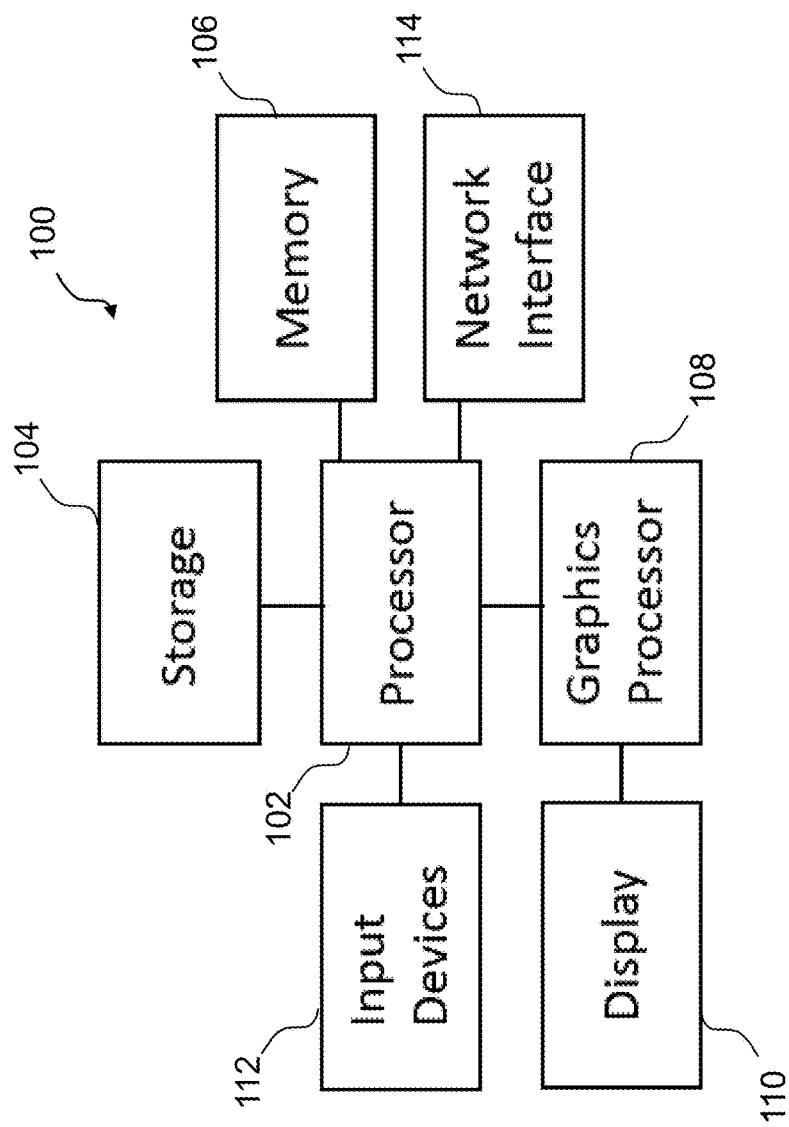
FIG. 12 is a block diagram identifying components of a computer system suitable for executing the automated data processing functions disclosed herein.

FIG. 12 is a block diagram identifying components of a system 100 suitable for executing the automated data processing functions disclosed herein. The processor 102 is generally any piece of computer hardware that is capable of executing computer programs that process data (e.g., a 3-D visualization application). The processor 102 may comprise electronic circuits, some of which may be packaged as an integrated circuit (e.g., a chip) or multiple interconnected integrated circuits. The processor 102 may be configured to execute computer programs, which may be stored onboard the processor or otherwise stored in a memory 106 as computer-readable program code. In alternative embodiments, the processor 102 may be embodied as or otherwise include one or more application-specific integrated circuits, field-programmable gate arrays or the like.

The storage 104 is generally any piece of hardware that is capable of storing digital data and computer programs (e.g., computer-readable program code and 3-D model files) on a permanent basis. Such storage may take the form of a hard drive, a solid-state drive, an optical disk, a magnetic tape or some combination thereof.

The memory 106 is generally any piece of computer hardware that is capable of storing digital data and computer programs (e.g., computer-readable program code and a 3-D model file) on a temporary basis. The memory 106 may include volatile and non-volatile memory, and may be fixed or removable. Examples of suitable memory include random access memory, read-only memory, a hard drive, a flash memory, a thumb drive, an SD card, a removable computer diskette, an optical disk, or some combination thereof.

In various instances, the storage 104 and the memory 106 may be referred to as a tangible computer-readable storage medium. A tangible computer-readable storage medium is a non-transitory device capable of storing information, and is distinguishable from computer-readable transmission media such as electronic transitory signals capable of carrying information from one location to another.

The system 100 further comprises one or more input devices 112. The input devices 112 may be wired or wireless, and may be configured to receive information from a user into the apparatus, such as for processing, storage and/or display. Examples of suitable user input devices include a mouse, microphone, image or video capture device, keyboard or keypad, joystick, touch-sensitive surface (separate from or integrated into a touchscreen), biometric sensor or the like.

In response to the input of a 3-D visualization activation command from the user via input devices 112, the processor 102 retrieves a file containing 3-D model data from the storage 104 and stores it temporarily in the memory 106. The processor 102 selectively processes the 3-D model data stored in memory 106 in accordance with other user inputs received via the input devices 112 and in accordance with instructions read from the 3-D visualization application software stored in memory 106.

In accordance with one implementation, the 3-D visualization application uses a graphics programming environment (like openGL) to instruct the processor 102 to load a 3-D model from storage 104. Sometimes the 3-D model data goes into the memory 106 and then is loaded into graphics memory (not shown) which is associated with or incorporated in the graphics processor 108, and on other occasions it may go directly into the graphics memory. The graphics processor 108 and associated graphics memory may be parts of an integrated graphic processing unit.

In addition to the storage 104 and 106, the processor 102 is connected to a graphics processor 108, which is in turn connected to a display device 110. The graphics processor 108 is configured to render for display digital 3-D models of a structural product composed of a plurality of parts and with respective viewpoints in response to receipt of coordinate transformation matrices from the processor 102. More specifically, the graphics processor 108 processes the 3-D model data and outputs pixel data to a digital image or raster graphics image file for display on a display device. In the alternative, it is common for high-end systems to have a central processing unit (CPU) as well as a graphics processing unit (GPU), but some systems, like lower-end computing systems or smartphones, may have a single processor with an embedded graphics processing chip (often referred to as "integrated" graphics), or even "software" rendering, which uses the CPU to render the images.

The processor 102 may also be connected to a network interface 114 for transmitting and/or receiving information, such as to and from other apparatus(es), network(s) or the like. The network interface 114 may be configured to transmit and/or receive information by physical (wired) and/or wireless communications links. Examples of suitable communication interfaces include a network interface controller (NIC), wireless NIC or the like.

The display device 110 may be configured to present or otherwise display information to a user. Suitable examples include a liquid crystal display, light-emitting diode display, plasma display panel or the like.

While methods for supplying an open interface for viewpoint navigation control during 3-D visualization have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "location" comprises position in a fixed 3-D coordinate system and orientation relative to that coordinate system, except in the case of the "location of a point" (a point does not have an orientation).

The process claims set forth hereinafter should not be construed to require that the steps recited therein be performed in alphabetical order (any alphabetical ordering in the claims is used solely for the purpose of referencing previously recited steps) or in the order in which they are recited.

The invention claimed is:

1. A method for controlling viewpoint navigation for three-dimensional visualization, comprising:
 (a) selecting a web page having a multiplicity of hyperlinks embedded therein which are associated with respective views of a three-dimensional model (14) of an object having respective predefined viewpoints;
 (b) using a web browser process of a two-dimensional layout application to display the web page in a first window (2), wherein the displayed web page has a two-dimensional layout (34) that includes a multiplicity of hyperlink symbols respectively associated with the multiplicity of hyperlinks embedded in the web page (42);
 (c) selecting a hyperlink symbol associated with a view of the three-dimensional model of the object having a selected predefined viewpoint (44);
 (d) generating a command message comprising hyperlink data and viewpoint data specifying a location of a virtual camera associated with the selected predefined viewpoint (46) in an HTTP format acceptable to an external application programming interface (API) in a web server process of a three-dimensional visualization application;
 (e) transferring the command message in HTTP format from the two-dimensional layout application to the external API;
 (f) using the external API to send the viewpoint data in the command message to an internal API function incorporated in the three-dimensional visualization application; and
 (g) using the internal API function to instruct a three-dimensional visualization process of the three-dimensional visualization application to retrieve data and display a view (36) of at least a portion of the three-dimensional model of the object in a second window (4) with the selected predefined viewpoint associated with the virtual camera location specified in the viewpoint data,
 wherein the first and second windows appear on display screens of different computers that communicate via a network and the external API.

2. The method as recited in claim 1, wherein the viewpoint data is expressed as hypertext comprising a hyperlink.

3. The method as recited in claim 1, wherein the viewpoint data comprises first data specifying a position of the virtual camera and second data specifying an orientation of the virtual camera.

4. The method as recited in claim 3, wherein the viewpoint data further comprises third data specifying a field-of-view of the virtual camera.

5. The method as recited in claim 3, wherein step (g) comprises converting the viewpoint data into a homogeneous transformation matrix representing the predefined viewpoint and then setting the viewpoint based on the homogeneous transformation matrix.

6. The method as recited in claim 1, wherein step (c) comprises converting x and y pixel coordinates of the selected portion of the web page into X and Y coordinates of the position of the virtual camera in a frame of reference of the three-dimensional model of the object.

7. The method as recited in claim 6, wherein the converting comprises translating and scaling.

8. The method as recited in claim 1, further comprising creating a multiplicity of files written in hypertext markup language and representing respective web pages having respective two-dimensional layouts, wherein each two-dimensional layout comprises a respective multiplicity of hyperlinks embedded therein which are associated with a respective set of views of a three-dimensional model of the object having respective predefined viewpoints.

9. A method for selecting a viewpoint of a visualization of at least a portion of a three-dimensional model (14) of an object, comprising:
 (a) creating a multiplicity of files written in hypertext markup language and representing respective web pages having respective two-dimensional layouts (34a-34c), wherein each two-dimensional layout comprises a respective multiplicity of hyperlink symbols associated with a respective multiplicity of hyperlinks, which respective multiplicity of hyperlinks are in turn associated with a respective set of views of a three-dimensional model of an object having respective predefined viewpoints;
 (b) using a web browser process to select a file from the multiplicity of files (42);
 (c) displaying a web page (34) corresponding to the selected file in a first window (2), wherein the displayed web page includes a two-dimensional layout comprising a multiplicity of hyperlink symbols;
 (d) selecting a hyperlink symbol in the two-dimensional layout displayed in step (c) (44), which selected hyperlink symbol is associated with a view of the three-dimensional model of the object having a selected predefined viewpoint;
 (e) generating a command message comprising hyperlink data and viewpoint data specifying a location of a virtual camera associated with the predefined viewpoint selected in step (d) (46) in a format defined in a specification of an application programming interface (API) in a web server process of a three-dimensional visualization application;
 (f) transferring the command message to a web server process (48); and
 (g) using the web server process to instruct a three-dimensional visualization process to retrieve data and display a view of at least a portion of the three-dimensional model of the object in a second window with the predefined viewpoint associated with the virtual camera location specified in the command message (50);
 wherein step (a) comprises:
 (a1) displaying a three-dimensional model (14) of an object having a viewpoint using a three-dimensional visualization process of the three-dimensional visualization application;
 (a2) changing the viewpoint of the displayed three-dimensional model to display multiple viewpoints in succession;
 (a3) selecting sets of data representing coordinates and angles of virtual camera locations corresponding to viewpoints attained during step (a2);
 (a4) generating hyperlinks corresponding to the selected viewpoints; and
 (a5) generating a hypertext markup language file containing data representing the web page having a multiplicity of hyperlinks embedded therein which are associated with respective views of the three-dimensional model (14) of the object having the respective selected viewpoints, and wherein the first and second windows appear on display screens of different computers that communicate via a network and the external API.

10. The method as recited in claim 9, wherein the viewpoint data comprises first data specifying a position of the virtual camera and second data specifying an orientation of the virtual camera.

11. The method as recited in claim 10, wherein the viewpoint data further comprises third data specifying a field-of-view of the virtual camera.

12. The method as recited in claim 10, further comprising converting the viewpoint data into a homogeneous transformation matrix representing the predefined viewpoint and then setting the viewpoint based on the homogeneous transformation matrix.

13. The method as recited in claim 9, wherein step (e) comprises converting x and y pixel coordinates of the selected portion of the web page into X and Y coordinates of the position of the virtual camera in a frame of reference of the model of the object.

14. The method as recited in claim 13, wherein the converting comprises translating and scaling.

15. The method as recited in claim 9, wherein step (a) comprises generating content for the multiplicity of files by selecting locations in the three-dimensional model and exporting files representing two-dimensional layouts.

16. The method as recited in claim 9, wherein step (a) comprises automatically retrieving two-dimensional location data from an attribute database and using the two-dimensional location data to generate the multiplicity of hyperlinks.

17. A computer system comprising one or more processors (16, 18, 20, 102, 108) and a non-transitory tangible computer-readable storage medium (104, 106) containing first executable code for executing a two-dimensional layout application (10) incorporating a web browser process, second executable code for executing a three-dimensional visualization application (12) incorporating a web server process having an external application programming interface (API) and a three-dimensional visualization process having an internal API communicatively coupled to the external API, and stored digital data representing a three-dimensional model (14) of an object, wherein the one or more processors are configured to be capable of performing the following operations:

(a) retrieving a web page using the web browser process in response to a first user input to a first window wherein the web page has a multiplicity of hyperlinks embedded therein which are associated with respective views of a three-dimensional model (14) of an object having respective predefined viewpoints;

(b) displaying the retrieved web page in the first window, wherein the displayed web page has a two-dimensional layout that includes a multiplicity of hyperlink symbols respectively associated with the multiplicity of hyperlinks embedded in the web page (42);

(c) generating a hypertext command message comprising viewpoint data specifying a location of a virtual camera associated with a view of the three-dimensional model of the object having a selected predefined viewpoint in response to a second user input to the first window that selects a hyperlink symbol associated with the selected predefined viewpoint (44), the hypertext command message being in a format defined in a specification of the external API;

(d) transferring the hypertext command message from the web browser process to the external API of the web server process;

(e) using the external API to send viewpoint data extracted from the command message to an internal API function;

(f) using the internal API function to create a transformation matrix from the viewpoint data; and (g) using a three-dimensional visualization process of the three-dimensional visualization application to retrieve data and display a view (36) of at least a portion of the three-dimensional model of the object in a second window with the selected predefined viewpoint associated with the virtual camera location specified by the transformation matrix;

wherein the first and second windows appear on display screens of different computers that communicate via a network and the external API.

18. The computer system as recited in claim 17, wherein the second executable code comprises an application for converting the viewpoint data into a homogeneous transformation matrix representing the predefined viewpoint.

* * * * *